(12) United States Patent
Abali et al.

(10) Patent No.: US 10,776,157 B2
(45) Date of Patent: *Sep. 15, 2020

(54) LIVE VIRTUAL MACHINE MIGRATION QUALITY OF SERVICE

(71) Applicant: INTERNATIONAL BUSINESS MACHINES CORPORATION, Armonk, NY (US)

(72) Inventors: Bulent Abali, Tenafly, NJ (US); Canturk Isci, Secaucus, NJ (US); Jeffrey O. Kephart, Cortlandt, NY (US); Suzanne K. McIntosh, Clifton, NJ (US); Dipankar Sarma, Bellandur (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/448,268

(22) Filed: Mar. 2, 2017

(65) Prior Publication Data

US 2017/0177408 A1 Jun. 22, 2017

Related U.S. Application Data

(63) Continuation of application No. 13/746,088, filed on Jan. 21, 2013, now Pat. No. 9,619,258.

(51) Int. Cl.
G06F 9/48 (2006.01)
G06F 9/455 (2018.01)

(52) U.S. Cl.
CPC ........ *G06F 9/4856* (2013.01); *G06F 9/45533* (2013.01); *G06F 9/45558* (2013.01); *G06F 2009/4557* (2013.01); *G06F 2009/45591* (2013.01); *G06F 2009/45595* (2013.01)

(58) Field of Classification Search
CPC ..................................................... G06F 9/4856
See application file for complete search history.

(56) References Cited

U.S. PATENT DOCUMENTS

| 8,239,538 | B2 | 8/2012 | Zhang et al. |
| 8,244,873 | B2 | 8/2012 | Baskaran et al. |
| 8,245,059 | B2 | 8/2012 | Jackson |
| 2009/0228589 | A1* | 9/2009 | Korupolu ............ H04L 67/1097 709/226 |
| 2011/0282982 | A1 | 11/2011 | Jain |

(Continued)

OTHER PUBLICATIONS

Anton Beloglazov et al., Adaptive Threshold-Based Approach for Energy-Efficient Consolidation of Virtual Machines in Cloud Data Centers, Dec. 2010.*

(Continued)

*Primary Examiner* — Sisley N Kim
(74) *Attorney, Agent, or Firm* — Tutunjian & Bitetto, P.C.; Samuel Waldbaum

(57) ABSTRACT

A system and method for providing quality of service during live migration includes determining one or more quality of service (QoS) specifications for one or more virtual machines (VMs) to be live migrated. Based on the one or more QoS specifications, a QoS is applied to a live migration of the one or more VMs by controlling resources including at least one of live migration network characteristics and VM execution parameters.

20 Claims, 5 Drawing Sheets

(56) References Cited

U.S. PATENT DOCUMENTS

2012/0207031 A1    8/2012   Cowart et al.
2012/0207176 A1    8/2012   Mukherjee

OTHER PUBLICATIONS

Stage et al., Network-aware migration control and scheduling of differentiated virtual machine workloads, May 23, 2009.*

Breitgand, D., et al. "Cost-Aware Live Migration of Services in the Cloud" Proceedings of the 3rd Annual Haifa Experimental Systems Conference. May 2010. pp. 1-6.

Checconi, F., et al. "Real-Time Issues in Live Migration of Virtual Machines" Euro-Par 2009—Parallel Processing Workshops, Fourth Workshop on Virtualization in High-Performance Cloud Computing. Aug. 2009. (13 Pages).

Isci, C., et al. "Improving Server Utilization Using Fast Virtual Machine Migration" IBM Journal of Research and Development, Vol. 55, No. 6. Nov./Dec. 2011. (12 Pages).

Oliveira, C., et al. "Impact of Server Dynamic Allocation on the Response Time for Energy-Efficient Virtualized Web Clusters" 12th Brazilian Workshop on Real-Time and Embedded Systems (WTR). 2010. (10 Pages).

Ranjan, S., et al. "QoS-Driven Server Migration for Internet Data Centers" Proceedings of IWQoS. 2002. (10 pages).

Verma, A., et al. "pMapper: Power and Migration Cost Aware Application Placement in Virtualized Systems" ACM/IFIP/USENIX 9th International Middleware Conference. Dec. 2008. pp. 243-264.

"VMware VSphere VMotion Architecture, Performance and Best Practices in VMware VSphere 5" Performance Study, Technical White Paper. 2012. pp. 1-26.

Yan, Y., et al. "Management of the Migration in Virtual Resource" Communications in Information Science and Management Engineering, CISME. vol. 1, No. 4. 2011. pp. 6-11.

* cited by examiner

LIVE VIRTUAL MACHINE MIGRATION QUALITY OF SERVICE

BACKGROUND

Technical Field

The present invention relates to migration, and more particularly to live virtual machine migration quality of service.

Description of the Related Art

Server virtualization continues to rain widespread adoption across industries with an ever-increasing level of virtual machine (VM) proliferation. As a consequence, dynamic, distributed resource management of VMs distributed across virtualized systems has emerged as a fundamental challenge where VMs need to be migrated across servers for resource balancing, performance, and power optimization goals. One key enabler and a prominent point of optimization, for such distributed resource management (DRM) techniques is live migration of VMs. Live migration refers to transferring an active VM from one server to another with an imperceptible disruption. For efficient, agile DRM and live migration, VM mobility the relative latency and overhead of moving VMs across hosts) is an important concern.

Existing quality of service (QoS) approaches almost exclusively focus on local resource management. This is referred to as steady state—"how to allocate resources among co-located VMs?" However, QoS measures are not reflected during migration. This is referred to as transitional state—"how to reflect similar QoS measures during VM migration?" A major pitfall with existing stead-state-only QoS specifications is that either there is no end-to-end QoS guarantee or rigid virtualization is applied to prevent any DRM actions.

SUMMARY

A method for providing quality of service during live migration includes determining one or more quality of service (QoS) specifications for one or more virtual machines (VMs) to be live migrated. Based on the one or more QoS specifications, a QoS is applied to a live migration of the one or more VMs by controlling resources including at least one of live migration network characteristics and VM execution parameters.

A method for providing quality of service during live migration includes determining one or more quality of service (QoS) specifications for one or more virtual machines (VMs) to be live migrated. Based on the one or more QoS specifications, a QoS is applied to a live migration of the one or more VMs by controlling resources including at least one of live migration network characteristics and VM execution parameters. Controlling resources further includes utilizing at least one of multiple networks, multiple configurations of a same network, and multiple migration paths each having different levels of service.

A method for providing quality of service during live migration includes determining one or more quality of service (QoS) specifications for one or more virtual machines (VMs) to be live migrated. Based on the one or more QoS specifications, a QoS is applied to a live migration of the one or more VMs by controlling resources including at least one of live migration network characteristics and VM execution parameters. Controlling resources further includes regulating network bandwidth for the one or more VMs during the live migration.

A system for providing quality of service during live migration includes a derivation module configured to determine one or more quality of service (QoS) specifications for one or more virtual machines (VMs) to be live migrated. A mapping module is configured to apply, using a processor, a QoS to a live migration of the one or more VMs based on the one or more QoS specifications by controlling resources including at least one of live migration network characteristics and VM execution parameters.

A system far providing quality of service during live migration includes a derivation module configured to determine one or more quality of service (QoS) specifications for one or more virtual machines (VMs) to be live migrated. A mapping module is configured to apply, using a processor, a QoS to a live migration of the one or more VMs based on the one or more QoS specifications by controlling resources including at least one of live migration network characteristics and VM execution parameters. The mapping module includes at least one of a network configuration module configured to utilize multiple networks and or multiple network configurations of a same network each providing different levels of service and a migration path module configured to utilize multiple migration paths each implemented with different technologies to provide different levels of service.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION

Figure 1:
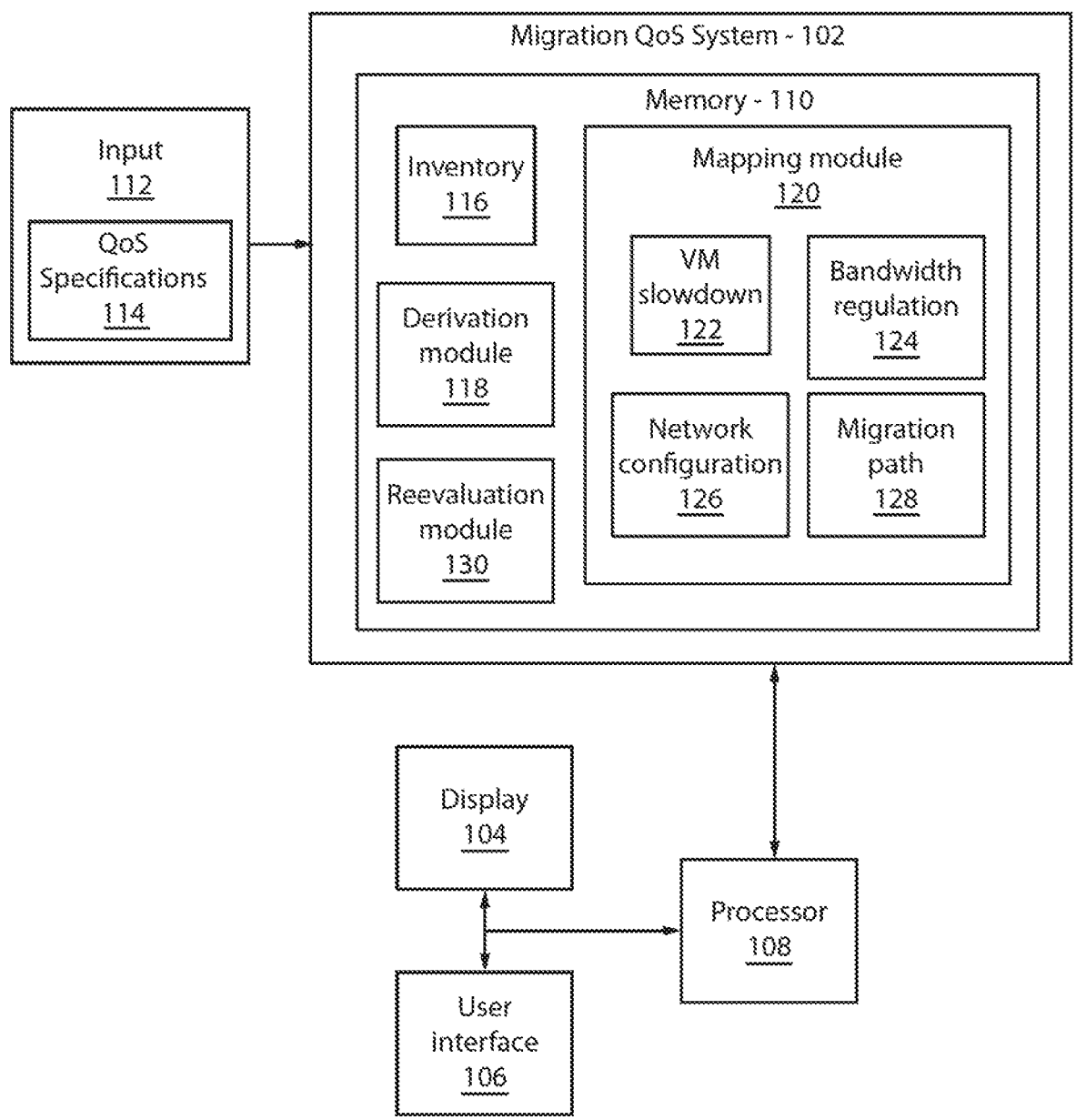
FIG. 1 is a block/flow diagram showing a system/method for implementing quality of service for live migration, in accordance with one illustrative embodiment.

In accordance with the present principles, systems and methods are provided for implementing quality of service (QoS) for the live migration of virtual machines (VMs). For one or more VMs to be live migrated, corresponding QoS specifications are identified. QoS specifications may be explicitly defined for live VM migration or may be derived from steady-state QoS specifications, which are commonly employed by virtualization management solutions to manage resource allocation to VMs running on a host or cluster. The QoS specifications may be represented as constraints or guarantees on resources (e.g., CPU, network, etc.) or may be duration based (e.g., latency, VM stop objective, etc.). The QoS may be defined in absolute terms or may be relative in terms of resource use, performance measures, etc. with respect to other VMs.

Based on the corresponding QoS, specifications, a live migration may be performed implementing a QoS using one or more migration controls to control resources including live migration network characteristics and/or VM execution parameters. In one embodiment, migration controls may control VM execution parameters to slow down the execution of a VM. A slowdown in VM execution results in a reduction in the amount of dirtied pages written, reducing the overall amount of pages transferred. VM slowdown may include controlling resource scheduling controls e.g., resource limits, scheduling priorities, etc.) and hardware controls (e.g., dynamic voltage and frequency scaling, etc.). In another embodiment, migration controls may control live migration network characteristics to regulate bandwidth during live migration. Bandwidth regulation may include dynamically and adaptively regulating bandwidth available to the in-flight migrations and statically capping bandwidth used for VM migration. In yet another embodiment, migration controls may control live migration network characteristics to utilize multiple migration networks and/or network configurations of the same network. Each network or configuration of a network may have drastic differences in migration latency, bandwidth, etc. In still another embodiment, migration controls may control live migration network characteristics to utilize multiple migration paths, each with different implementation technologies. Different technologies can lead to tradeoffs in latency, overhead, etc. Other migration controls are also contemplated.

Using one or more migration controls, a QoS can be implemented for a live migration of VMs. In one embodiment, QoS may be implemented by assigning relative priorities to VMs. Migration controls may be applied according to the priority. In another embodiment, QoS may be implemented by regulating network resources. In still another embodiment, QoS may be implemented by regulating CPU overhead. Other QoS implementations are also contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible urn that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a farther example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to the drawings in which like numerals represent the same or similar elements and initially to FIG. 1, block/flow diagram showing a system 100 for implementing QoS for live migration of one or more VMs in accordance with one illustrative embodiment. The migration CoS system 102 uses migration control knobs based on availability and trade-offs to provide transitional state QoS in addition to steady state QoS.

The migration QoS system 102 preferably includes one or more processors 108 and memory 110 for storing programs, applications, data, etc. The system 102 may also include a display 104 for viewing. The display 104 may also permit a user to interact with the system 102 and its components and functions. This may be further facilitated by a user interface 106, which may include a keyboard, mouse, joystick, or any other peripheral or control to permit user interaction with the system 102. It should be understood that the functions and components of the system 102 may be integrated into one or more systems.

The migration QoS system 102 may receive input 112, which may include migration QoS definitions or specifications 114 for the set of VMs to be managed. QoS specifications 114 may include, e.g., constraints, priorities, duration-based terms, etc. for the live migration of VMs. VMs managed by the system 102 and their associated migration QoS specifications may be stored as part of a VM inventory 116, which may be used in virtualization management tools to track existing VMs in a virtual infrastructure, their configurations, resource allocations, etc.

QoS specifications may include explicitly defined migration QoS specifications and derived migration QoS specifications for VMs. Defined QoS specification priorities may be explicitly defined for VM migration itself. Derived migration QoS specifications may be derived from steady-state QoS specifications, such as, e.g., reservations, limits and shares defined in VMware systems, max and min specifications in Xen, etc. Just as resource constraints themselves, QoS specifications can be defined in absolute resource terms (similar to reservations and limits) or relative resource terms (similar to shares). For example, in one illustrative embodiment, absolute QoS measures can be defined for a VM in isolation (e.g., how much CPU resource (e.g., in MHz) and memory (e.g., in MB) a VM is entitled to during migration) while relative QoS measures may be defined with respect to other VMs sharing the same resource (e.g., VM1 is entitled to twice the network bandwidth of VM2 when they are migrated simultaneously, and thus share the migration related resources). In basic principles, the absolute measures resemble the form of reservations and limits, which are used in steady-state QoS measures, and the relative measures are of similar nature to shares. QoS specifications can be defined for system resources (e.g., constraints or guarantees on, e.g., processors, memory, network, etc.) or may be duration based (e.g., latency, VM stop objective, etc.).

Illustrative examples of different QoS specifications are provided as follows:
Explicit, Relative Migration QoS Definition on Network Resource:
  migNetwShare(VM1)=10; migNetwShare(VM2)=20
Explicit, Absolute Migration QoS Definition on CPU Overhead:
  migCpuLimit(VM1)=1000 MHz; migCpuLimit(VM2)=2000 MHz
Derived, Relative Migration QoS Definition: In this example case, steady-state CPU Shares defined for two VMs are used as baseline to derive the relative migration QoS specifications for the same two VMs:
  cpuShare(VM1)=100; cpuShare(VM2)=1000
  migResShare(VM1)=1; migResShare(VM2)=10;

The memory 110 may include derivation module 118. At the beginning of each migration period involving one or more VMs to be migrated, the derivation module 118 is configured to derive the corresponding QoS specifications, which may include associated resource constraints, for each VM to be migrated. The derivation module 118 preferably references the inventory 116 to identify QoS specifications associated with the VM to be migrated.

The memory 110 may also include mapping module 118 configured to map the QoS specifications to one or more migration control knobs to implement QoS. Migration control knobs may include VM slowdown 122, bandwidth regulation 124, network configuration 126 and migration path 128. Other control knobs are also contemplated.

A VM slowdown knob 122 is configured to apply resource management controls to slow down the execution of the VM during migration. As the execution of the VM slows down, the amount of dirtied (i.e., written) pages decreases, resulting in an overall reduced amount of pages to be transferred. This, in turn, results in less overall pressure on the migration network and quicker migration convergence. VM slowdown knob 122 may apply a number of system and hardware resource controls. For example, resource scheduling level controls may include, e.g., resource limits, scheduling priorities, shares which enable the limiting of absolute or relative runtime resource allocation of VMs, etc. In another example, hardware level controls may include, e.g., leveraging dynamic voltage and frequency scaling (DVFS) to enable similar slowdown effects (without stun disruptions) for running VMs, etc. Other implementations of VM slowdown are also contemplated.

Figure 2:
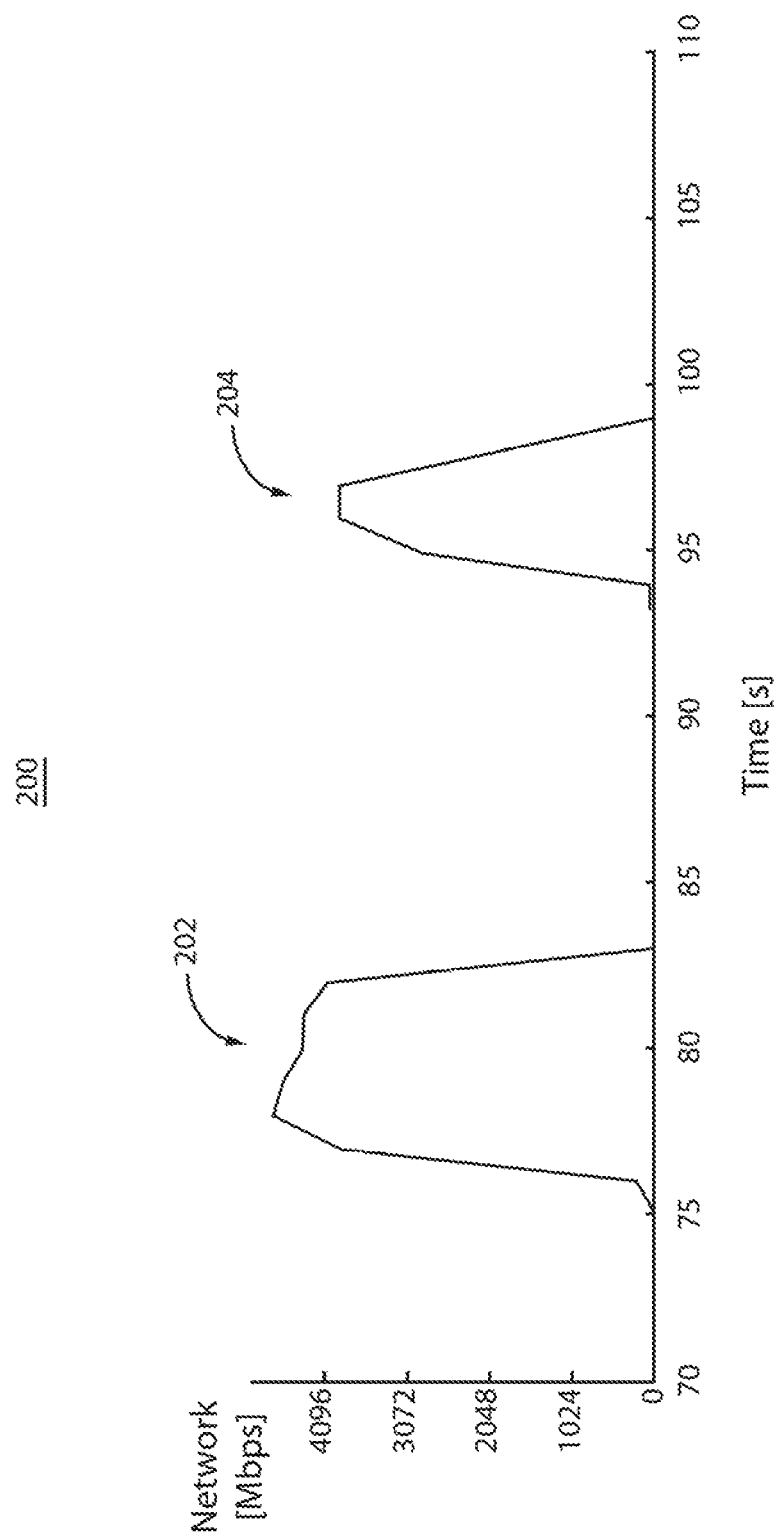
FIG. 2 is an exemplary depiction showing virtual machine slowdown, in accordance with one illustrative embodiment.

Referring for a moment to FIG. 2, an example of VM slowdown is illustratively depicted in accordance with one embodiment. The graph 200 shows network data transfer (in megabits per second) against time (in seconds) for a VM that is migrated back and forth between two hosts. The VM is first migrated from a first host to a second host without VM slowdown 202. The VM is then migrated back from the second host to the first host with VM slowdown 204. As can be seen, the slowed down VM 204 converges faster with much less data transfer.

Referring back to FIG. 1, a bandwidth regulation knob 124 is configured to regulate bandwidth during VM migration. For example, available bandwidth can be dynamically and adaptively modulated for in-flight migrations or can be bandwidth capped at a statically-assigned bandwidth. Other embodiments of bandwidth regulation are also contemplated. Bandwidth regulation is a versatile approach that not only provides trade-off points between migration latency and network usage, but may also be applied to control other resources, such as, e.g., a CPU, energy overhead, etc.

Figure 3:
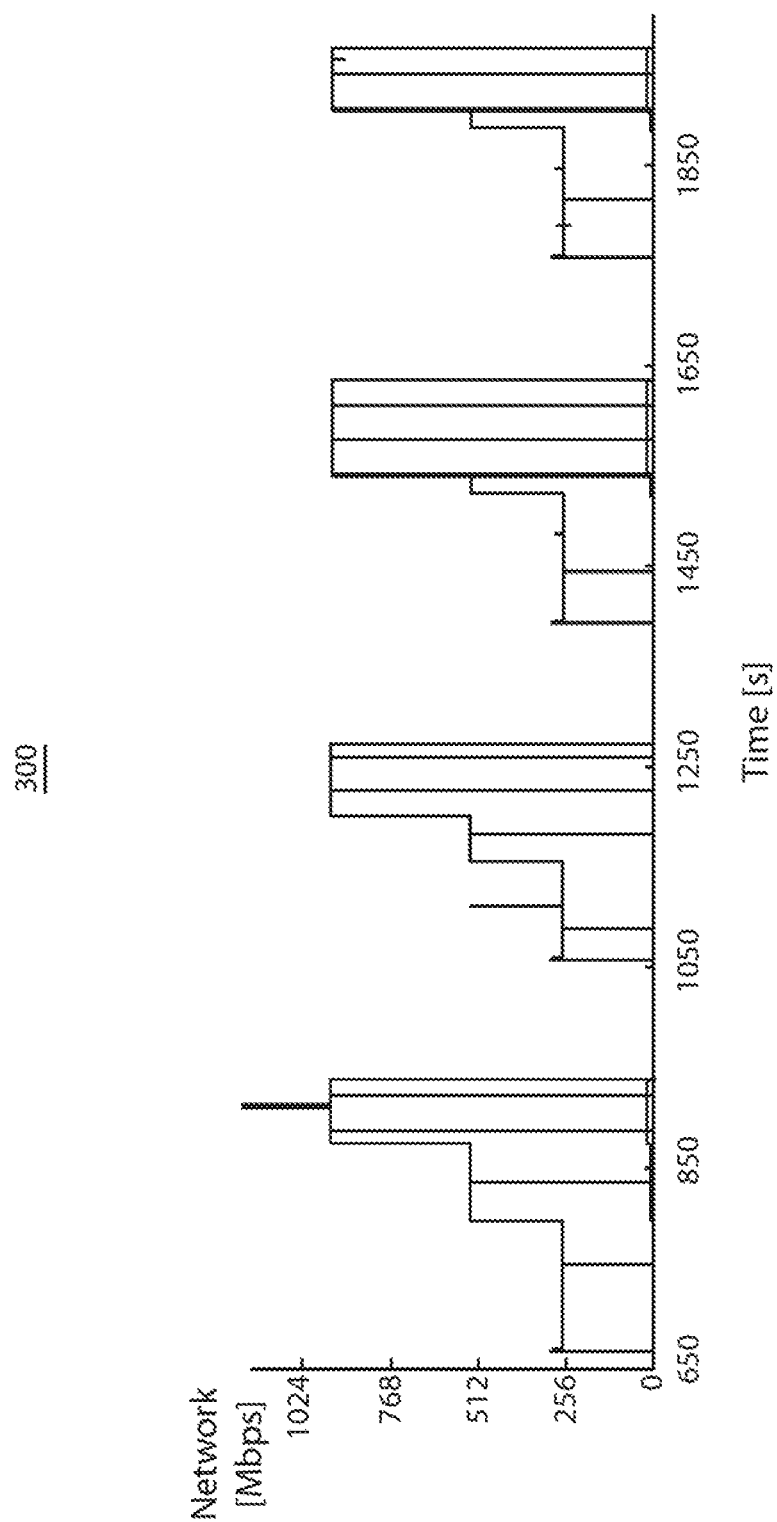
FIG. 3 is an exemplary depiction showing adaptive bandwidth regulation, in accordance with one illustrative embodiment.

Referring for a moment to FIG. 3, an example of adaptive bandwidth regulation is illustratively depicted in accordance with one embodiment. The graph 300 shows network data transfer (in megabits per second) against time (in seconds) for VMs that are transferred back and forth between two hosts. Bandwidth is dynamically and adaptively modulated to increase as a live migration process for a VM progresses.

Referring back to FIG. 1, a network configuration knob 126 is configured to migrate VMs using multiple migration network's and/or the same network link with different configurations. Network configurations may include, e.g., maximum transmission unit (MTU) configurations, network device level QoS controls for different flows, etc. Other configurations are also contemplated.

Figure 4:
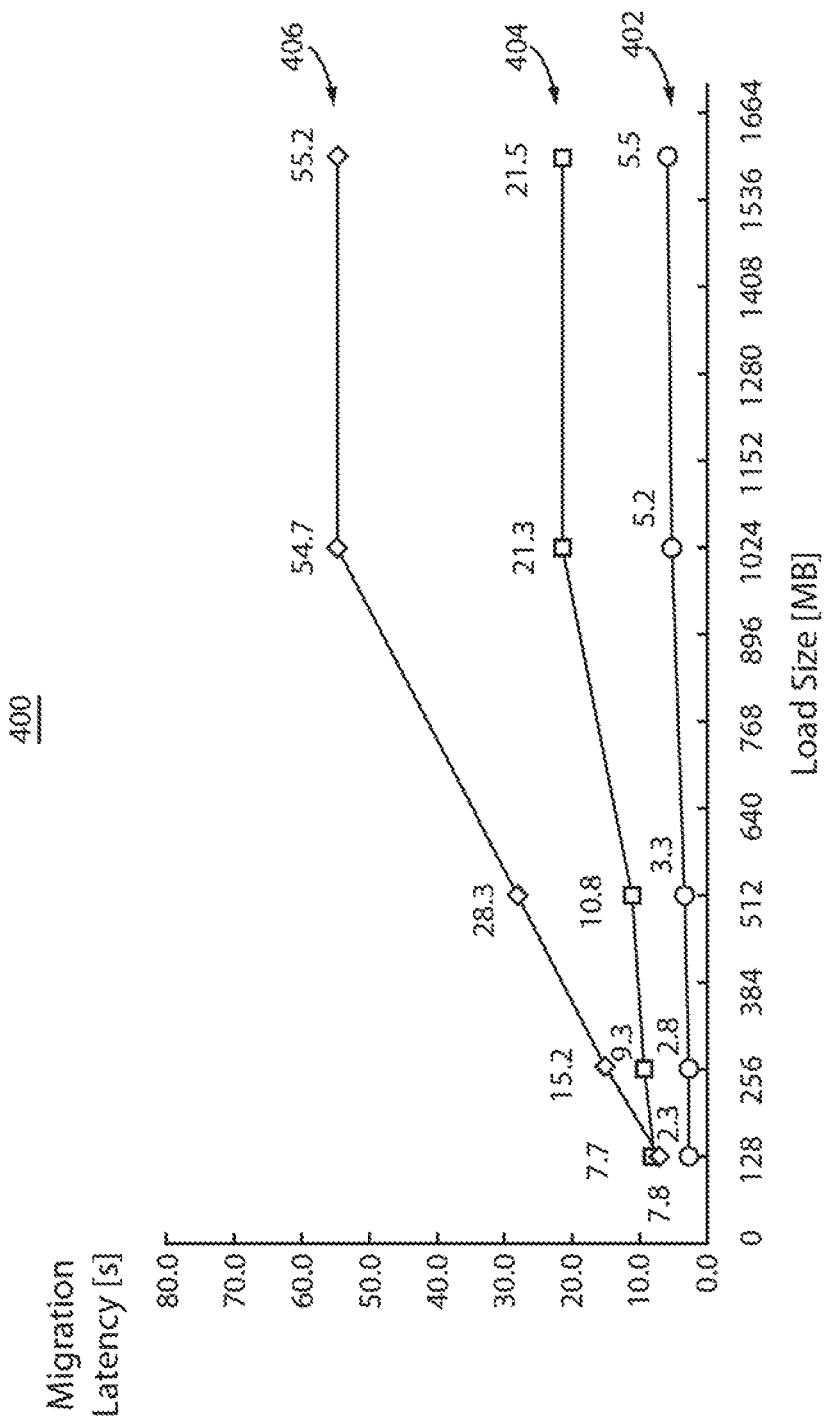
FIG. 4 is an exemplary depiction showing multiple network configurations, in accordance with one illustrative embodiment.

Referring for a moment to FIG. 4, an example of using multiple network configurations for VM migration is illustratively depicted in accordance with one embodiment. The graph 400 shows average, migration latency (in seconds) against load size (in megabytes) for VM migrations 402, 404, 406 migrated over different network configurations. As can be seen, utilizing different network configurations for each VM migration can create drastic differentiation in migration latency and utilized bandwidth.

Referring back to FIG. 1, a migration path knob 128 is configured to migrate VMs using different migration paths, each implemented with different technologies, which can result in a dramatic differentiation on migration performance and overhead. Different technologies can lead to different trade-offs for latency, overhead, etc. Table 1 illustratively demonstrates migration performance as a comparison of different technologies: infiniband (IB) vs, Ethernet (T3) and remote direct memory access (RDMA) vs. standard transmission control protocol (TCP). For example, RDMA is shown to dramatically relieve CPU overhead by offloading the transfer computation off of general purpose CPUs. VM stop time refers to the time spent while the VM is temporarily stopped to transfer a small amount of final memory and architectural state during the last phase of live migration. Other implementation technologies are also contemplated. While the migration path knob 128 may be costly to implement, it provides dramatic QoS differentiation between VMs, which may be of high value for high-end, enterprise systems.

TABLE 1 latency comparison for different migration paths including different technologies.

|  | IB-TCP | IB-RDMA | T3-TCP | T3-RDMA |
| --- | --- | --- | --- | --- |
| Total time (sec) | 4.044 | 2.256 | 4.609 | 1.921 |
| Stop time (sec) | 0.0345 | 0.0225 | 0.0325 | 0.0219 |

As discussed above, the mapping module 120 is configured to map QoS specifications to one or more control knobs to implement a QoS. A QoS may be implemented by a number of embodiments using one or more control knobs. For example, QoS specifications may be mapped to one or more control knobs based upon, e.g., availability of the control knobs, fit of the provided QoS definition, optimization trade-offs, etc. The following embodiments discuss different implementations of QoS using one or more control knobs. It should be understood that the following embodiments are meant to be exemplary and are not limiting. Other embodiments are also contemplated.

In one embodiment, QoS may be implemented by assigning VMs to be migrated with relative migration priorities (i.e., shares). One or more control knobs may be applied in accordance with the priority. For example, VMs with the highest priority may be migrated over the path with the fastest implemented technology (e.g., migration path knob 128) or the fastest configured network (e.g., network configuration knob 126). Migration may be performed sequentially, in parallel with constraints (e.g., bandwidth regulation) so as to not overwhelm the migration link, etc. In another example, lower priority VMs may be migrated over paths with slower technology (e.g., migration path knob 128) or configured networks (e.g., network configuration knob 126). In another example, the lowest priority VMs may be migrated over the slower paths or configured networks with additional constraints, such as bandwidth throttling (e.g., bandwidth regulation knob 124), etc.

In another embodiment, QoS may be implemented in terms of network resources. For example, a VM may include an absolute QoS specification for network bandwidth limits. A static bandwidth regulation (e.g., bandwidth regulation knob 124) may be applied at the specified level for each VM migration. In another example, a VM may include a relative QoS specification for network allocations. Available network capacity may be proportionally distributed between migrating VMs via a semi-static bandwidth regulation (bandwidth regulation knob 124), VM slowdown (VM slowdown knob 122), etc. Semi-static bandwidth regulation refers to a static bandwidth regulation that is reevaluated after the completion of each migration in the case of relative QoS specifications. This is because as each VM finishes its migration, the resources can be redistributed among the remaining VMS with ongoing migrations to reflect their relative resource allocation, As an illustrative example of semi-static bandwidth regulation, consider three VMs: VM1, VM2, and VM3 with the following relative QoS definitions for network: migNetwShare(VM1): migNetwShare(VM2): migNetwShare(VM3)=1:3:6. When these three VMs have simultaneously running migrations on a 1 Gbps link, bandwidth regulation allocates 100 Mbps 300 Mbps and 600 Mbps for the three VMs respectively, in accordance with their relative QoS definitions. Now, assume that VM3's migration finishes. At this point the only relevant QoS definition is migNetwShare(VM1): migNetwShare(VM2)=1:3. Therefore, the available bandwidth is redistributed between the remaining two VMs, while still matching their relative QoS. This results in an adjustment in bandwidth regulation to arrive at the new distribution giving VM1 250 Mbps and VM2 750 Mbps.

In yet another embodiment, QoS may be implemented in terms of CPU overhead. For example, a VM may include relative or absolute QoS specifications for. CPU overhead. The migration process may be regulated via adaptive bandwidth regulation (bandwidth regulation 124), VM slowdown (VM slowdown 122), etc. CPU resource use may be fed back to tune the bandwidth regulation to the desired state of CPU resource use.

Memory 110 may also include reevaluation module 130 configured to iteratively reevaluate resource distributions and QoS specification mappings after each migration. The mapping module 120 may adjust the mappings of the QoS specifications to one or more control knobs for QoS implementation based upon the reevaluated resource distribution. Once there are no more incoming migrations and the only migrations in flight are defined with absolute QoS specifications, the system 102 returns to a wait state until the arrival of the next migration period.

Figure 5:
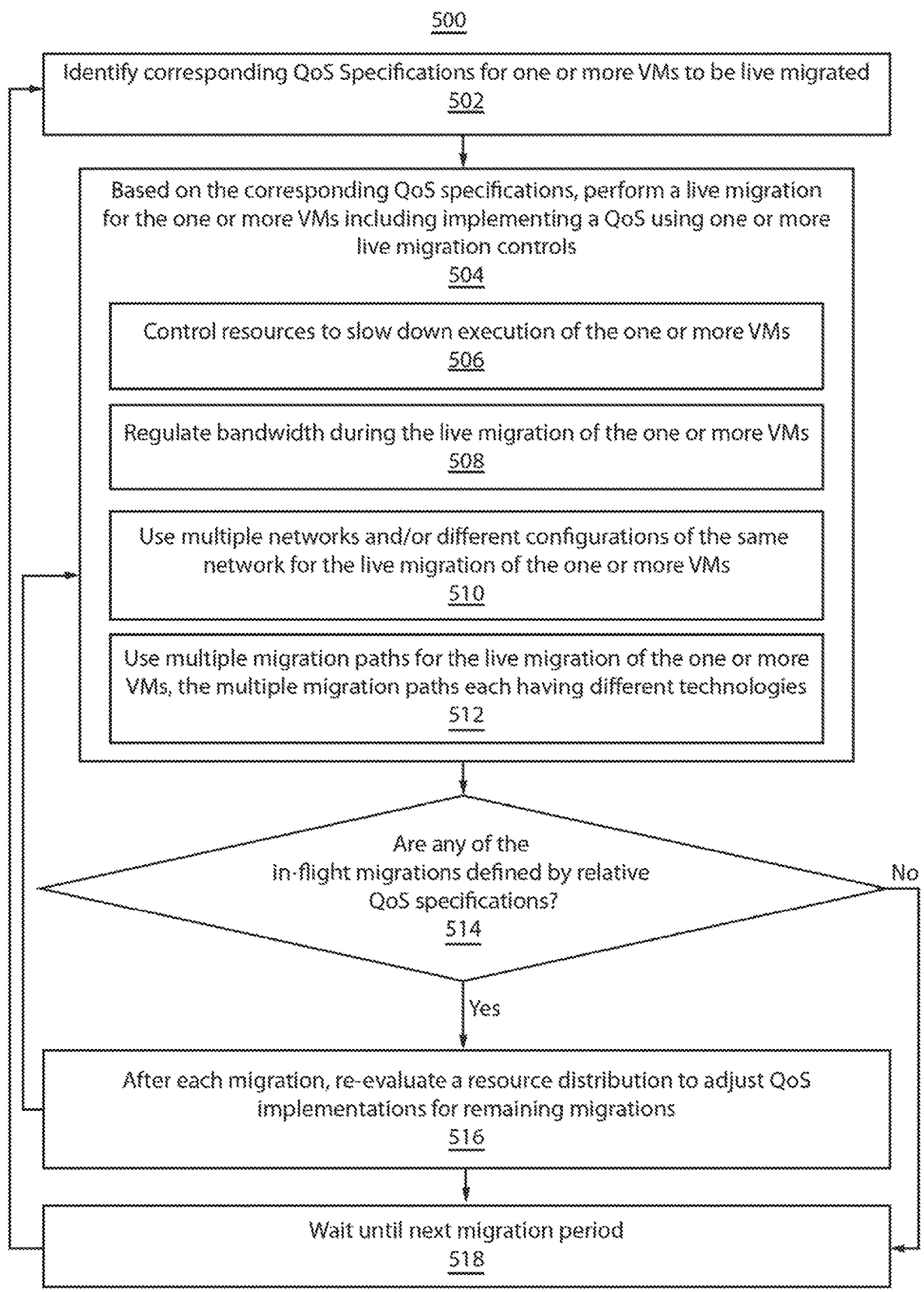
FIG. 5 is a block/flow diagram showing a system/method for implementing quality of service for live migration, in accordance with one illustrative embodiment.

Referring now to FIG. 5, a block/flow diagram showing a method 500 for implementing QoS for live migration is illustratively depicted in accordance with one embodiment. In block 502, QoS specifications corresponding to one or more VMs that are to be live migrated are identified. Identifying corresponding QoS specifications for one or more VMs to be live migrated may include referencing a VM inventory to identify the QoS specifications associated with the one or more VMs.

The inventory may store VMs and associated QoS specifications for all VMs it manages. QoS specifications may include explicitly defined QoS specifications. QoS specifications may also include derived QoS specifications. Preferably, derived QoS specifications are derived from, steady-state QoS specifications (e.g., reservations, limits, shares, etc.). QoS specifications may be defined in absolute terms or in terms relative to other VMs. QoS specifications may be defined for a target, such as constraints or guarantees of resources (e.g., processor, memory, network, etc.) or may be defined for a duration (e.g., latency, etc.)

In block 504, based on the corresponding QoS specifications, a live migration is performed for the one or more VMs, which may include implementing a QoS using one or more live migration controls or knobs to control resources. Controlling resources preferably includes controlling live migration network characteristics and/or VM execution parameters.

In block 506, controlling VM execution parameters may include controlling resources to slow down the execution of the one or more VMs during the live migration. As the execution of the VM slows down, the amount of dirtied pages decreases, which reduces the amount of pages to be transferred. This results in a reduction in the amount of network resources used for migration and quicker migration convergence. Controlling resources may include resource scheduling controls such as, e.g., resource limits, scheduling priorities, and hardware controls, such as, e.g., DVFS. Other resource controls are also contemplated.

In block 508, controlling live migration network characteristics may include regulating bandwidth during the live migration of the one or more VMs. Regulating bandwidth may include dynamically and adaptively regulating bandwidth during migration, or may include statically capping bandwidth during migration. Other bandwidth regulation methods are also contemplated.

In block 510, controlling live migration network characteristics may include using multiple migration networks and/or different network configurations of the same network for the live migration of the one or more VMs. Each network or a configuration of a network may have drastic differences in migration latency and bandwidth. Thus, a VM may utilize multiple different networks or configurations of the same network for live migration, in accordance with its QoS specification.

In block 512, controlling live migration network characteristics may include using multiple migration paths for the live migration, wherein the multiple migration paths have different implementation technologies. Different technologies can lead to tradeoffs in latency, overhead, etc. Different technologies may include, for example, Infiniband, Ethernet, RDMA, TCP, etc. Other technologies are also contemplated.

It should be understood that the above-discussed live migration controls are illustrative and not limiting. Other live migration controls are also contemplated. Using one or more of the live migration controls, a QoS may be implemented for live migration.

In one embodiment, the QoS may be implemented by assigning relative priorities to the one or more VMs to be live migrated. Live migration controls may be applied in accordance with the priority. For example, the highest priority VMs may be migrated over the fastest network or configuration (block 510) or may be migrated, over the path with the fastest implementation technology (block 512). In another example, mid-level priority VMs may be migrated over a slower network or network configuration (block 510) or may be migrated over a migration path with a slower implementation technology (block 512). In still another example, lowest priority VMs may be migrated over a slower network or network configurations (block 510) or may be migrated over a path with a slower implementation technology (block 512), with additional constraints such as bandwidth throttling (block 508), etc.

In another embodiment, the QoS may be implemented by regulating network resources. For example, for a VM with an absolute QoS specification in terms of network bandwidth limits, a static bandwidth regulation (block 508) may be applied at the level as defined in the absolute QoS specification. In another example, for a VM with a relative QoS specification in terms of network bandwidth, network capacity may be proportionally distributed between migrating VMs using a semi-static bandwidth regulation (block 508) or controlling resources to slowdown VM execution (block 506). Semi-static bandwidth regulation refers to static allocations of bandwidth that is reevaluated after each migration.

In still another embodiment, the QoS may be implemented by regulating CPU overhead. For example, VMs with absolute relative QoS specifications in terms of CPU overhead may be migrated by regulating its bandwidth (block 508) or controlling resources to slowdown VM execution (block 506). This may involve CPU use feedback to tune bandwidth regulation to the desired CPU state.

It is noted that the above implementations of QoS are meant to be illustrative. Other QoS implementations are also contemplated.

In block 514, if any of the in-flight migrations are defined by relative QoS specifications, then in block 516, a resource distribution is reevaluated to adjust QoS implementations of remaining migrations after the completion of each migration. The method then returns to block 504.

If there are no more incoming migrations and if the in-flight migrations are not defined by relative QoS specifications (i.e., the in-flight migrations are defined by absolute QoS specifications), then in block 518, the method waits until the next migration period. The method starts again at block 502 at the start of the next migration period.

Having described preferred embodiments for live virtual machine migration quality of service (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for providing quality of service during live migration, comprising:
    determining one or more quality of service (QoS) specifications for one or more virtual machines (VMs) to be live migrated; and
    based on the one or more QoS specifications, applying, using a processor, a QoS to a live migration of the one or more VMs by controlling resources including at least one of live migration network characteristics and VM execution parameters,
        wherein applying the QoS includes assigning priorities to the one or more VMs, and
        wherein the controlling resources includes utilizing multiple, different migration paths, and higher priority VMs are migrated over paths utilizing different, faster implemented types of networking technologies than lower priority VMs.

2. The method as recited in claim 1, wherein controlling resources includes controlling resources to slow down an execution of the one or more VMs during the live migration.

3. The method as recited in claim 1, wherein controlling resources includes regulating network bandwidth for the one or more VMs during live migration.

4. The method as recited in claim 3, wherein regulating network bandwidth includes at least one of adaptively regulating network bandwidth and statically assigning bandwidth.

5. The method as recited in claim 1, wherein controlling resources includes utilizing multiple networks and/or multiple network configurations of a same network each providing different levels of service.

6. The method as recited in claim 1, wherein controlling resources includes utilizing multiple migration paths each implemented with different technologies to provide different levels of service.

7. The method as recited in claim 1, wherein the one or more QoS specifications includes one or more explicitly defined QoS specifications.

8. The method as recited in claim 1, wherein the one or more QoS specifications includes one or more derived QoS specifications.

9. The method as recited in claim 8, wherein the one or more derived QoS specifications includes one or more derived QoS specifications based on at least one of steady-state QoS specifications, relative resource allocations, absolute resource limits, and absolute resource guarantees.

10. The method as recited in claim 1, wherein applying the QoS includes controlling network bandwidth for the one or more VMs.

11. The method as recited in claim 1, wherein applying the QoS includes controlling processor overhead for the one or more VMs.

12. The method as recited in claim 1, further comprising re-evaluating a resource distribution after each live migration to adjust a QoS implementation.

13. A method for providing quality of service during live migration, comprising:
    determining one or more quality of service (QoS) specifications for one or more virtual machines (VMs) to be live migrated; and
    based on the one or more QoS specifications, applying, using a processor, a QoS to a live migration of the one or more VMs by controlling resources including at least one of live migration network characteristics and VM execution parameters, wherein controlling resources further includes utilizing at least one of multiple networks, multiple configurations of a same network, and multiple migration paths each having different levels of service,
        wherein applying the QoS includes assigning priorities to the one or more VMs, and
        wherein the controlling resources includes utilizing multiple, different migration paths, and higher priority VMs are migrated over paths utilizing different, faster implemented types of networking technologies than lower priority VMs.

14. The method as recited in claim 13, wherein applying the QoS includes controlling network bandwidth for the one or more VMs.

15. The method as recited in claim 13, wherein applying the QoS includes controlling processor overhead for the one or more VMs.

16. The method as recited in claim 13, wherein controlling resources includes utilizing multiple migration paths each implemented with different technologies to provide different levels of service.

17. The method as recited in claim 13, wherein the one or more QoS specifications includes one or more explicitly defined QoS specifications.

18. The method as recited in claim 13, wherein the one or more QoS specifications includes one or more derived QoS specifications.

19. The method as recited in claim 18, wherein the one or more derived QoS specifications includes one or more derived QoS specifications based on at least one of steady-state QoS specifications, relative resource allocations, absolute resource limits, and absolute resource guarantees.

20. The method as recited in claim 13, wherein applying the QoS includes controlling network bandwidth for the one or more VMs.

* * * * *